United States Patent
Hsu (10) Patent No.: US 12,155,620 B2
(45) Date of Patent: Nov. 26, 2024

(54) COMMUNICATION METHOD AND COMMUNICATION SYSTEM

(71) Applicant: Moxa Inc., New Taipei (TW)

(72) Inventor: Wen-Lung Hsu, New Taipei (TW)

(73) Assignee: Moxa Inc., New Taipei (TW)

( * ) Notice: Subject to any disclaimer, the term of this patent is extended or adjusted under 35 U.S.C. 154(b) by 0 days.

(21) Appl. No.: 18/118,085

(22) Filed: Mar. 6, 2023

(65) Prior Publication Data

US 2024/0223528 A1    Jul. 4, 2024

(30) Foreign Application Priority Data

Dec. 28, 2022   (TW) .................................. 111150421

(51) Int. Cl.
| | | |
|---|---|---|
| H04L 67/55 | (2022.01) | |
| H04L 41/34 | (2022.01) | |
| H04L 45/74 | (2022.01) | |
| H04L 51/212 | (2022.01) | |
| H04L 51/56 | (2022.01) | |

(Continued)

(52) U.S. Cl.
CPC .............. *H04L 51/56* (2022.05); *H04L 41/34* (2022.05); *H04L 45/74* (2013.01); *H04L 51/212* (2022.05); *H04L 67/12* (2013.01); *H04L 67/55* (2022.05); *H04L 69/08* (2013.01)

(58) Field of Classification Search
CPC ......... H04L 41/34; H04L 69/08; H04L 51/56; H04L 51/212
See application file for complete search history.

(56) References Cited

U.S. PATENT DOCUMENTS

| | | | |
|---|---|---|---|
| 10,484,251 B1 * | 11/2019 | Gupta | ..................... H04L 69/18 |
| 11,843,685 B1 * | 12/2023 | Hartley | ..................... H04L 69/08 |
| 2016/0157129 A1 | 6/2016 | Guthmann | |

(Continued)

FOREIGN PATENT DOCUMENTS

| | | |
|---|---|---|
| CN | 109151043 A | 1/2019 |
| CN | 113114775 A | 7/2021 |

OTHER PUBLICATIONS

Anonymous, GitHub—martin-ger/MQTT_VPN: IP over MQTT for ESP controllers and Linux, Aug. 7, 2021, p. 1, XP093087503, Aug. 7, 2021.

*Primary Examiner* — Boris D Grijalva Lobos
(74) *Attorney, Agent, or Firm* — Winston Hsu (57) ABSTRACT

A communication method for a user terminal and a device terminal to exchange packets through a message broker, comprises the user terminal wrapping a first packet of a first communication protocol into a second packet with a second communication protocol and sending the second packet to the message broker, and the device terminal receiving the second packet from the message broker and obtaining the first packet wrapped in the second packet; or the device terminal wrapping a third packet of the first communication protocol into a fourth packet with the second communication protocol and sending the fourth packet to the message broker, and the user terminal receiving the fourth packet from the message broker and obtaining the third packet wrapped in the fourth packet. The first communication protocol is a communication protocol supported by the device terminal; the second communication protocol is a communication protocol supported by the message broker.

17 Claims, 7 Drawing Sheets

(51) Int. Cl.
*H04L 67/12* (2022.01)
*H04L 69/08* (2022.01)

(56) References Cited

U.S. PATENT DOCUMENTS

| | | | |
|---|---|---|---|
| 2018/0270310 A1 | 9/2018 | Venkatesan | |
| 2019/0334995 A1* | 10/2019 | Shanmugam | H04W 4/80 |
| 2020/0099761 A1 | 3/2020 | Wang | |
| 2021/0211515 A1* | 7/2021 | Rozo | H04L 67/12 |
| 2021/0409923 A1 | 12/2021 | Kumar | |
| 2023/0224299 A1* | 7/2023 | Qie | H04L 63/10 |
| | | | 726/5 |
| 2024/0040523 A1* | 2/2024 | Lee | H04W 76/28 |

\* cited by examiner

COMMUNICATION METHOD AND COMMUNICATION SYSTEM

BACKGROUND OF THE INVENTION

1. Field of the Invention

The present invention relates to a communication method and a communication system, and more particularly, to a communication method and a communication system for communicating through a message broker.

2. Description of the Prior Art

In decentralized Internet of Things (IoT) applications, due to security concerns, connecting and accessing IoT devices located in an internal network from an external network is not allowed. When the IoT devices operate abnormally (but the connection works normally), such restriction hinders the equipment maintenance personnel from performing remote fault analysis and troubleshooting.

In general, the integration solution for accessing IoT devices is implemented through a virtual private network (VPN). When the equipment maintenance personnel attempt to access IoT devices from the external network, both the device used by the maintenance personnel and the IoT device need to be connected to the VPN. Through a VPN server and a VPN client, a reliable and safe transmission channel can be established for access therebetween. However, for decentralized IoT applications, a large number of devices give rise to a large number of device connection management requirements, so that corresponding application logic components are required for integration. In this situation, higher performance requirements are needed for IOT devices, and the used intermediary software (e.g. Open VPN server with additional device management components) may not be widely available due to high cost caused by the high complexity.

Recently, public cloud service providers have provided remote IoT device access solutions for IOT applications, which use non-VPN ways to establish transmission channels. However, a lot of utilization restrictions have been produced due to the business model or other factors of intermediary services and public cloud services. For example, intermediary services generally include channel technology that provides information transmission and management components for managing equipment and information transmission, and the technology is complex and not disclosed. For companies with limited development and maintenance capabilities, the channel technology coupled with complex connection management logic substantially raises the complexity of system design and technical threshold, which result in difficulties to deploy and maintain the system by their own.

SUMMARY OF THE INVENTION

Therefore, the present invention is to use the existing IoT message communication protocol of the IOT device and the existing IoT message intermediary service server to establish a reliable, safe and convenient channel for accessing the network service of a remote device without adding additional components. Accordingly, while retaining the low-efficiency requirements of IOT devices, the technical level and maintenance complexity of accessing remote devices are reduced.

An embodiment of the present invention discloses a communication method for a user terminal to communicate with a device terminal through a message broker. The communication method comprises wrapping a first packet of a first communication protocol into a second packet with a second communication protocol and sending the second packet to the message broker; or receiving a third packet of the second communication protocol from the message broker and obtaining a fourth packet of the first communication protocol wrapped in the third packet; wherein the first communication protocol is a communication protocol supported by the device terminal, and the second communication protocol is a communication protocol supported by the message broker.

An embodiment of the present invention discloses a communication method for a device terminal to communicate with a user terminal through a message broker. The communication method comprises receiving a first packet of a first communication protocol from the message broker and obtaining a second packet of a second communication protocol wrapped in the first packet; or wrapping a third packet of the second communication protocol into a fourth packet with the first communication protocol and sending the fourth packet to the message broker; wherein the first communication protocol is a communication protocol supported by the message broker, and the second communication protocol is a communication protocol supported by the device terminal.

An embodiment of the present invention discloses a communication system. The communication system comprises a user terminal, a device terminal and a message broker. The message broker, coupled to the user terminal and the device terminal, is for exchanging packets between the user terminal and the device terminal, wherein the user terminal and the device terminal perform a communication method through the message broker. The communication method comprises the user terminal wrapping a first packet of a first communication protocol into a second packet with a second communication protocol and sending the second packet to the message broker, and the device terminal receiving the second packet of the second communication protocol from the message broker and obtaining the first packet of the first communication protocol wrapped in the second packet; or the device terminal wrapping a third packet of the first communication protocol into a fourth packet with the second communication protocol and sending the fourth packet to the message broker, and the user terminal receiving the fourth packet of the second communication protocol from the message broker and obtaining the third packet of the first communication protocol wrapped in the fourth packet; wherein the first communication protocol is a communication protocol supported by the device terminal, and the second communication protocol is a communication protocol supported by the message broker.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to".

Figure 1:
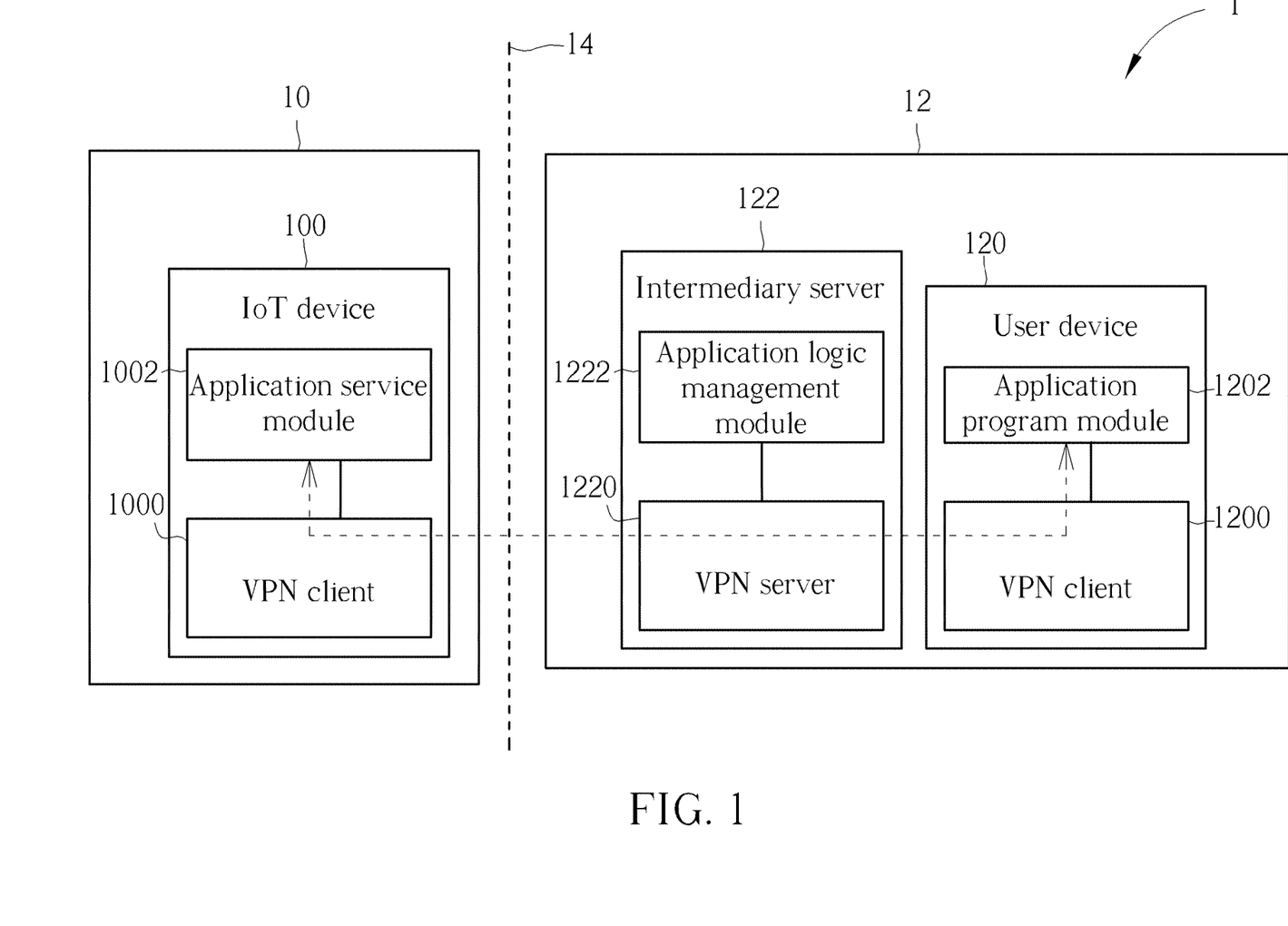
FIG. 1 is a schematic diagram of remote access to an IoT device through a virtual private network (VPN).

Please refer to FIG. 1. FIG. 1 is a schematic diagram of a network 1, and illustrates the architecture of remote access to an IoT device through a VPN. In FIG. 1, the network 1 comprises an internal network (intranet) 10, a firewall 14 and an external network (internet) 12, and the network 1 may be divided into an internal network 10 and an external network 12 through the firewall 14. When equipment maintenance personnel attempt to access an IoT device 100 inside the internal network 10 from a user device 120 located in the external network 12, a transmission channel needs to be established through an intermediary server 122. Specifically, the IOT device 100 and the user device 120 need to connect to a VPN server 1220 of an intermediary server 122 through a VPN client 1000 and a VPN client 1200 respectively to build a reliable and secure transmission channel, so that the user device 120 and the IoT device 100 are able to communicate with each other. However, due to application requirements and hardware limitations, different IOT devices provide different types of network application services for access, such as web service, file transfer protocol (FTP), Secure Shell Protocol (SSH), etc. In this situation, a large number of IoT devices lead to a large number of device connection management requirements. In addition to establishing corresponding transmission channels according to different network application services, it is also necessary to consider the security mechanism for establishing transmission channels in the Internet of Things (e.g. distribution of digital certificates and the subsequent management mechanism thereof) and connection status management of transmission channels. Therefore, the intermediary server 122 usually needs to configure an application logic management module 1222 to integrate complex management logic for device connection, which causes difficulties in development and management.

In view of the above problems, the present invention utilizes the existing IOT message brokers and IoT message protocols prepared for the IOT devices, and therefore, additional VPN servers or additional security mechanisms, as certificate such distribution and management, are not necessary to be set up. Accordingly, a simple and secure channel for accessing the network service of a remote device (hereinafter referred to as the service access channel) and a device connection management method may be established without including additional components to reduce the complexity of maintenance and operation. Due to application requirements and hardware limitations, IoT devices generally use built-in and lightweight message protocols with publish-subscribe pattern to transmit data from the internal network to the external network, or receive instructions from the external network. For example, common message protocols for IOT devices include Message Queuing Telemetry Transport (MQTT), Advanced Message Queuing Protocol (AMQP), Constrained Application Protocol (CoAP), and the present invention may establish a service access channel according to such message protocols, so that the IOT device and the user device may use the Transmission Control Protocol (TCP) network communication services (e.g. SSH, HTTP, FTP) and manage IoT device connections through the service access channel. In other words, the present invention utilizes the original secure message transmission mechanism of the IoT device to establish a service access channel for network services, so there is no need to additionally establish corresponding connections and security mechanisms to different network services. Accordingly, the present invention may reduce the complexity of the intermediary server to exactly have the simple capability for message transmission while maintaining low performance requirements for the IoT devices.

Figure 2:
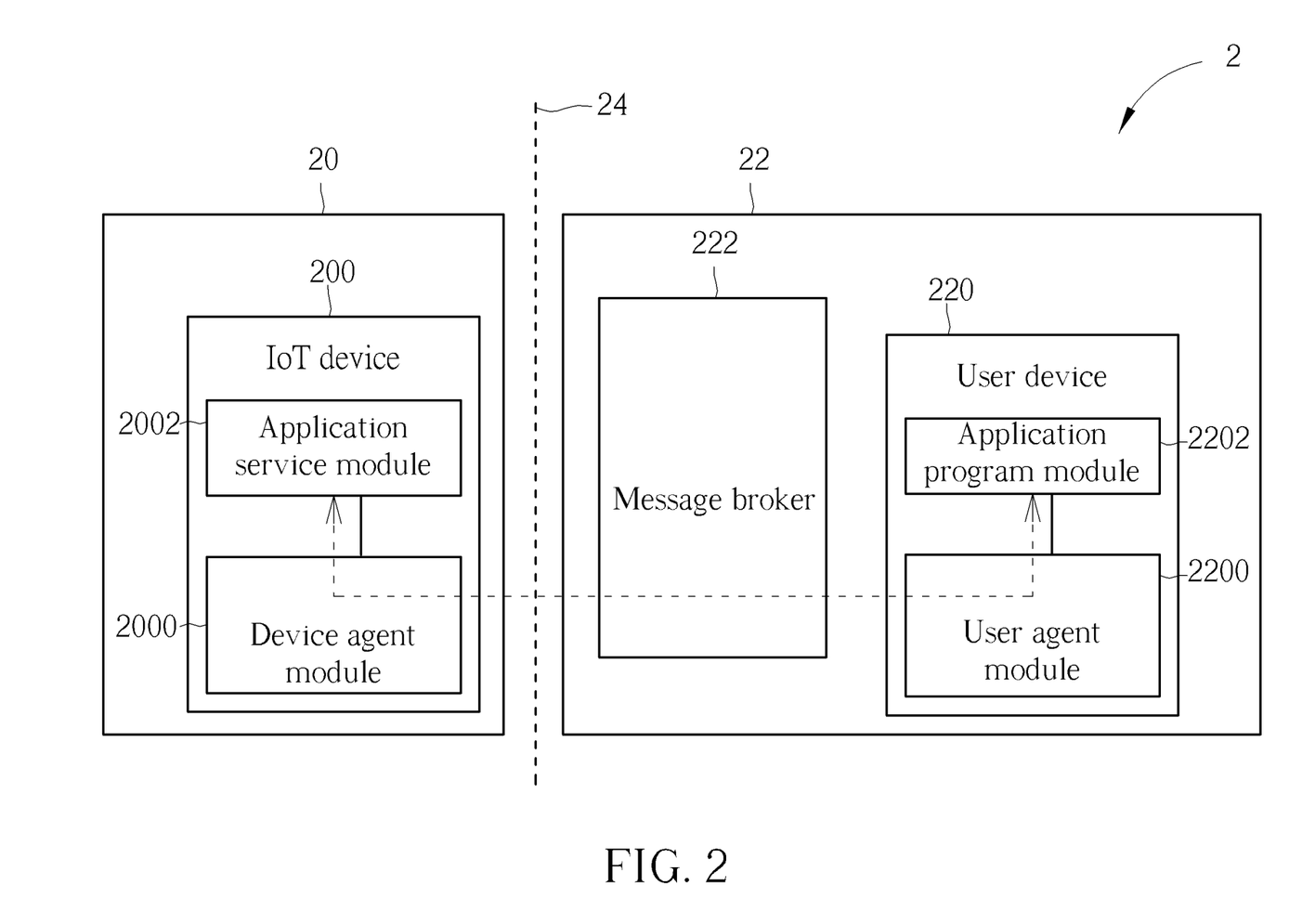
FIG. 2 is a schematic diagram of remote access to an IoT device through an IoT message broker according to an embodiment of the present invention.

Please refer to FIG. 2. FIG. 2 is a schematic diagram of a network 2 according to an embodiment of the present invention, and illustrates the architecture of remote access to an IoT device through an IoT message broker. As shown in FIG. 2, the network 2 comprises an internal network (intranet) 20, a firewall 24 and an external network (internet) 22, and the network 2 may be divided into an internal network 20 and an external network 22 through the firewall 24. In detail, the internal network 20 may be a private network, which may comprise an IoT device 200, and the IoT device 200 may be a device terminal with communication capabilities. The external network 22 may be a public network, which may comprise a user device 220 and a message broker 222. The user device 220 may be a user-terminal communication device used by the maintenance personnel. The message broker 222 may be a network device that provides a message exchange service with publish-subscribe pattern. The embodiment of the present invention takes an MQTT message broker as an example, but is not limited thereto. The firewall 24 may be a security device in the network 2, which may be used to separate different networks (the internal network 20, the external network 22) and may be used to control the passage of data in the internal network 20, so as to ensure the security of the internal network 20.

In this embodiment, when the user device 220 located in the external network 22 attempts to remotely access the IoT device 200 inside the internal network 20, the message broker 222 acts an intermediary. Specifically, the IoT device 200 comprises a device agent module 2000 and an application service module 2002. The device agent module 2000 may be a resident program running on the device terminal, which comprises an MQTT client for exchanging messages with the message broker 222; the application service module 2002 may provide TCP network services, such as HTTP server, FTP server, SSH server. The user device 220 comprises a user agent module 2200 and an application program module 2202. The user agent module 2200 may be a resident program running on the user terminal, which comprises an MQTT client for exchanging messages with the message broker 222; the application program module 2202 may provide TCP network service, such as HTTP client (browser), FTP client, SSH client. When the maintenance personnel access the network service provided by the application service module 2002 of the IoT device 200 from the user device 220 through the application program module 2202, the messages are actually transmitted from the user agent module 2200, to the message broker 222, and then to the device agent module 2000 through a message protocol (such as MQTT) supported by the message broker 222. Similarly, When the application service module 2202 of the IoT device 200 returns a response message to the application program module 2202 of the user device 220, the response message is also transmitted from the device agent module 2000, to the message broker 222, and then to the user agent module 2200 through the message protocol supported by the message broker 222.

Figure 3:
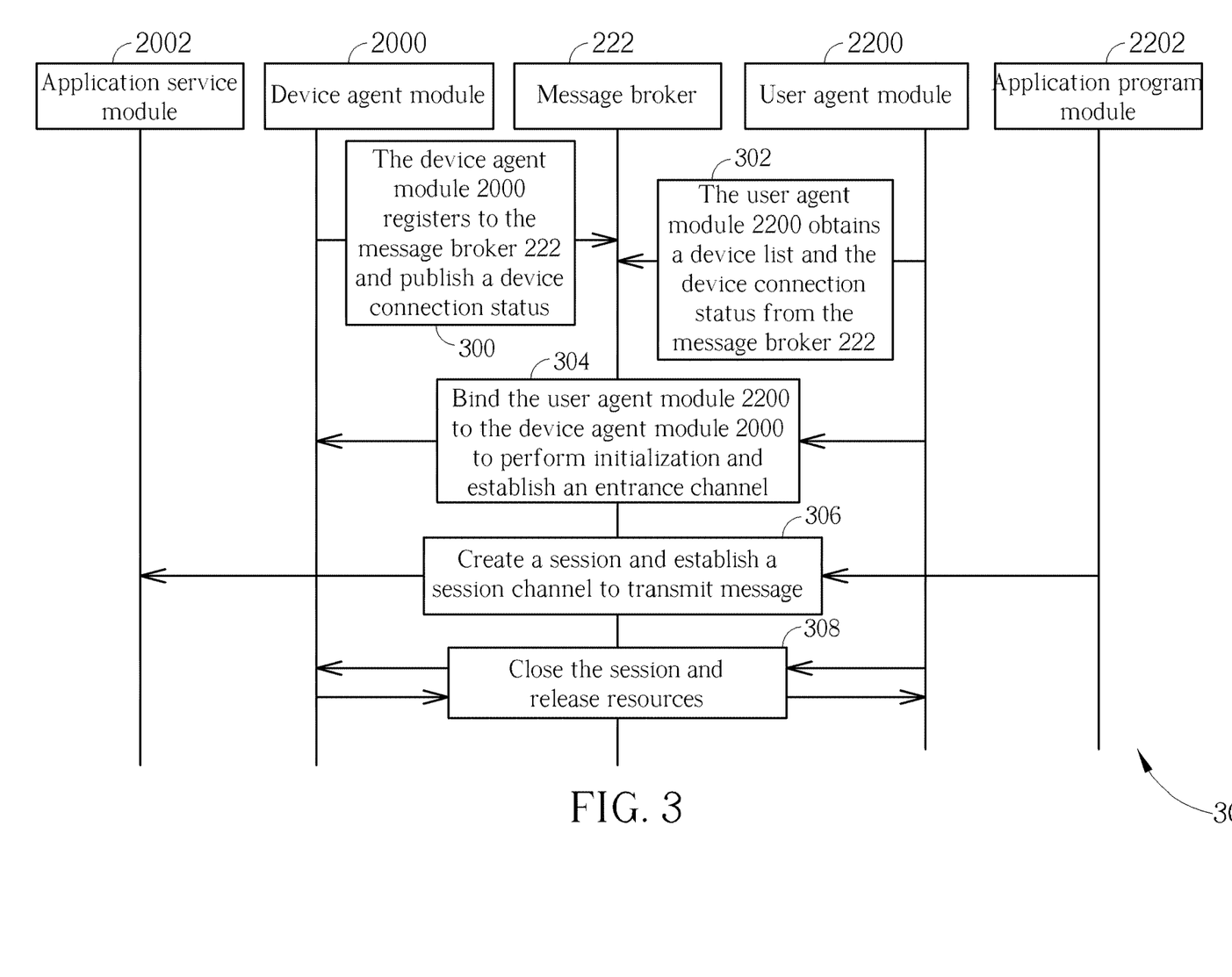
FIG. 3 is a schematic diagram of a process for establishing a channel for accessing the network service of a remote device between a user terminal and an IoT device terminal through an IoT message broker according to an embodiment of the present invention.

As to the operating principle of the network 2, please continue to refer to FIG. 3. FIG. 3 is a schematic diagram of a process 30 according to an embodiment of the present invention, which illustrates the operating method of establishing the service access channel between the user device 220 and the IOT device 200 through the IoT message broker. The process 30 comprises the following steps:

Step 300: The device agent module 2000 registers to the message broker 222 and publishes a device connection status.

Step 302: The user agent module 2200 obtains a device list and the device connection status.

Step 304: Bind the user agent module 2200 to the device agent module 2000 to perform initialization and establish an entrance channel.

Step 306: Create a session and establish a session channel to transmit message.

Step 308: Close the session and release resources.

According to the process 30, the device agent module 2000 has to register device identification (ID) to the message broker 222 and publish a connection status such as online or offline according to the registered device ID (Step 300). Next, the user agent module 2200 may obtain a device list and device connection status from the message broker 222 (Step 302), and accordingly, the maintenance personnel may specify the IoT device to be connected according to the device list and the device connection status. By specifying the device ID of the IoT device and a user ID of the user terminal, the user agent module 2200 may be bound with the device agent module 2000 (for example, log in, log out), so that the initialization related to the network service may be performed and an entrance channel for the maintenance personnel to access the network service may be established (Step 304). When the maintenance personnel attempt to access the network services provided by the application service module 2002, such as HTTP, FTP, SSH, a session is triggered and then a session channel is established for transmitting messages (Step 306). Finally, after the access to the network service provided by the application service module 2002 finishes, the session is closed and related resources are released (Step 308).

In the process 30, the data handshake between the device agent module 2000 and the user agent module 2200 may be implemented through the topic of publish-subscribe pattern and the message transmission therein. In general, the topic name is a UTF-8 string and may be determined according to the system or design requirements. In addition, the topic name also supports a hierarchical structure with a forward slash to separate the levels of the hierarchy, which may be used for category management. In the publish-subscribe pattern, messages are published to a topic by a publisher, and a subscriber will receive all the messages published on the topic subscribed by the subscriber. Moreover, through specific wildcards such as "+" or "#", subscribers may set topic filtering conditions for topic filtering, and the message broker will deliver messages to subscribers based on topic names and topic filtering conditions.

In detail, in Step 300, the device agent module 2000 has to register device identification (ID) to the message broker 222 and publish a connection status. First, the step proceeds to create a first topic with a topic name comprising the device ID, and according to the device ID contained in the topic name of the first topic, the device may be registered to the message broker 222. The topic name of the first topic may be in the form of "smtunnel/groupID/deviceID/state", wherein the deviceID may be a device ID, and the groupID may be a group ID of a group to which the device belongs. The topic name of the first topic is only used to illustrate the embodiment of the present invention, and the number of levels and the content may be adjusted according to actual needs, and is not limited thereto. Then, the device agent module 2000 may publish related connection status such as online or offline to the first topic. The device agent module 2000 may publish online or offline messages through the function of retained messages, so that subscribers who subscribe to the first topic later may also obtain the correct connection status of the device. Moreover, the device agent module 2000 may set an LWT (Last Will and Testament) message, and thereby an offline message may be published to the first topic after the device agent module 2000 disconnects unexpectedly. Accordingly, the device agent module 2000 may correctly publish the connection status to the subscribers of the first topic.

In Step 302, the user agent module 2200 may obtain a device list and device connection status from the message broker 222. Specifically, the user agent module 2200 may filter topics by setting the topic filtering conditions, and the message broker 222 sends messages of topics that meet the topic filtering conditions to the user agent module 2200 according to the topic name and the topic filtering conditions. Accordingly, the user agent module 2200 may obtain the required device list, and further obtain the device connection status according to the message of the topic that meets the topic filtering conditions. For example, the user agent module 2200 may use the wildcard "+" to set a topic filtering condition such as "smtunnel/group_1/+/state", so as to subscribe to the first topics of all devices belonging to the group group_1 (group ID). According to the retained message (online or offline message) published by the device agent module 2000 in Step 300, the user agent module 2200 may receive the correct device connection status of all devices belonging to the group group_1. The user agent module 2200 may obtain the device list and the device connection status as shown in Table 1 below. It should be noted that the group IDs and device IDs shown in Table 1 are merely for illustration purposes, and may have different forms according to actual situations.

TABLE 1

| Group ID | Device ID | Device Connection Status |
|---|---|---|
| group_1 | device_1 | online |
| group_1 | device_2 | online |
| group_1 | device_3 | offline |

After the user agent module 2200 obtains the device list and the device connection status as shown in Table 1 above, the device agent module 2000 of the designated device may be bound for performing initialization and establishing an entrance channel in Step 304. The user agent module 2200 may have a Universally Unique Identifier (UUID) as a user ID of the user terminal. The user agent module 2200 may create a second topic and a third topic with topic names comprising the device ID of the designated device and the user ID so as to associate or disassociate with the device agent module 2000. After the association between the user agent module 2200 and the device agent module 2000 is established, the user agent module 2200 may create an entrance channel for the application program module 2202 to connect to. While attempting to access the IoT device 200, the maintenance personnel may carry out the access through the entrance channel in a normal way.

In detail, the topic name of the second topic may be and not limited to the form of "smtunnel/groupID/deviceID/clientID/login", wherein the deviceID may be a device ID, the groupID may be a group ID of a group to which the device belongs, and the clientID may be a user ID. Through the second topic, the user agent module 2200 may send a request message for logging in to the designated device to establish association. In practice, the user agent module 2200 may publish a login message to the second topic, and the content of the message may comprise related information of the network service to be accessed. On the other hand, by subscribing the second topic, the device agent module 2000 may obtain the user ID of the login user and the related information of the network service to be accessed. For example, if the maintenance personnel with user ID client_1 wants to start an SSH connection with the IoT device having a group ID of group_1 and a device ID of device_1, then the user agent module 2200 may publish a login message with the content "localhost: 22" to the topic "smtunnel/group_1/device_1/client_1/login". By setting the topic filtering condition such as "smtunnel/group_1/device_1/+/login", the IOT device 200 is able to subscribe to the topic "smtunnel/group_1/device_1/client_1/login", and thereby obtain the user ID of the login user (client_1) and receive message with the content "localhost: 22". Accordingly, the association between the user agent module 2200 and the device agent module 2000 may be established.

On the other hand, the topic name of the third topic may be and not limited to the form of "smtunnel/groupID/deviceID/clientID/logout". The deviceID may be a device ID, the groupID may be a group ID of a group to which the device belongs, and the clientID may be a user ID. Through the third topic, the user agent module 2200 may send a request message for logging out of the designated device to cancel the association. Similarly, by subscribing to the third topic, the device agent module 2000 may obtain the user id of the logout user. For example, if the maintenance personnel with user ID client_1 intend to log out of the IoT device with a group ID of group_1 and a device ID of device_1, then the user agent module 2200 may publish a logout message to the topic "smtunnel/group_1/device_1/client_1/logout". Accordingly, the association between the user agent module 2200 and the device agent module 2000 may be canceled.

After the association between the user agent module 2200 and the device agent module 2000 is established, a session and a session channel may be established to start message transmission in Step 306. Specifically, the entrance channel created by the user agent module 2200 comprises a TCP listener service. When the TCP listener service receives an access to the network service provided by the access application service module 2002 of the IoT device 200 from the application module 2202 by the maintenance personnel, an establishment of the session is triggered.

In detail, when the session is established, the embodiment of the present invention generates a session ID and accordingly establishes the session channel. Specifically, the session channel comprises an input channel from the application program module 2202, the user agent module 2200, the message broker 222, the device agent module 2000 to the application service module 2002, and an output channel from the application service module 2002, the device agent module 2000, the message broker 222, the user agent module 2200 to the application program module 2202. In practice, for the user device 220, the data transmission between the application program module 2202 and the user agent module 2200 may be realized through network I/O. Similarly, for the IOT device 200, the data transmission between the application service module 2002 and the device agent module 2000 may be also realized through network I/O. The input channel from the user agent module 2200, the message broker 222 to the device agent module 2000 is realized by publishing and subscribing to a fourth topic. Similarly, the output channel from the device agent module 2000, the message broker 222 to the user agent modules 2200 is realized by publishing and subscribe to a fifth topic.

The topic name of the fourth topic may be and not limited to the form of "smtunnel/groupID/deviceID/clientID/sessionID/in". The deviceID may be a device ID, the groupID may be a group ID of a group to which the device belongs, the clientID may be a user ID, and the sessionID may be the session ID of the session triggered in Step 306. The user agent module 2200 publishes messages to the fourth topic, and then the device agent module 2000 may receive the messages published by the user agent module 2200 through subscribing to the fourth topic. That is to say, through the fourth topic, the device agent module 2000 is able to receive the message sent by the user agent module 2200. Similarly, the topic name of the fifth topic may be and not limited to the form of "smtunnel/groupID/deviceID/clientID/sessionID/out". The device agent module 2000 publishes messages to the fifth topic, and then the user agent module 2200 may receive the messages published by the device agent module 2000 through subscribing to the fifth topic. That is to say, through the fifth topic, the user agent module 2200 is able to receive the message sent by the device agent module 2000. Accordingly, the connection between the user agent module 2200 and the device agent module 2000 is established.

Figure 4:
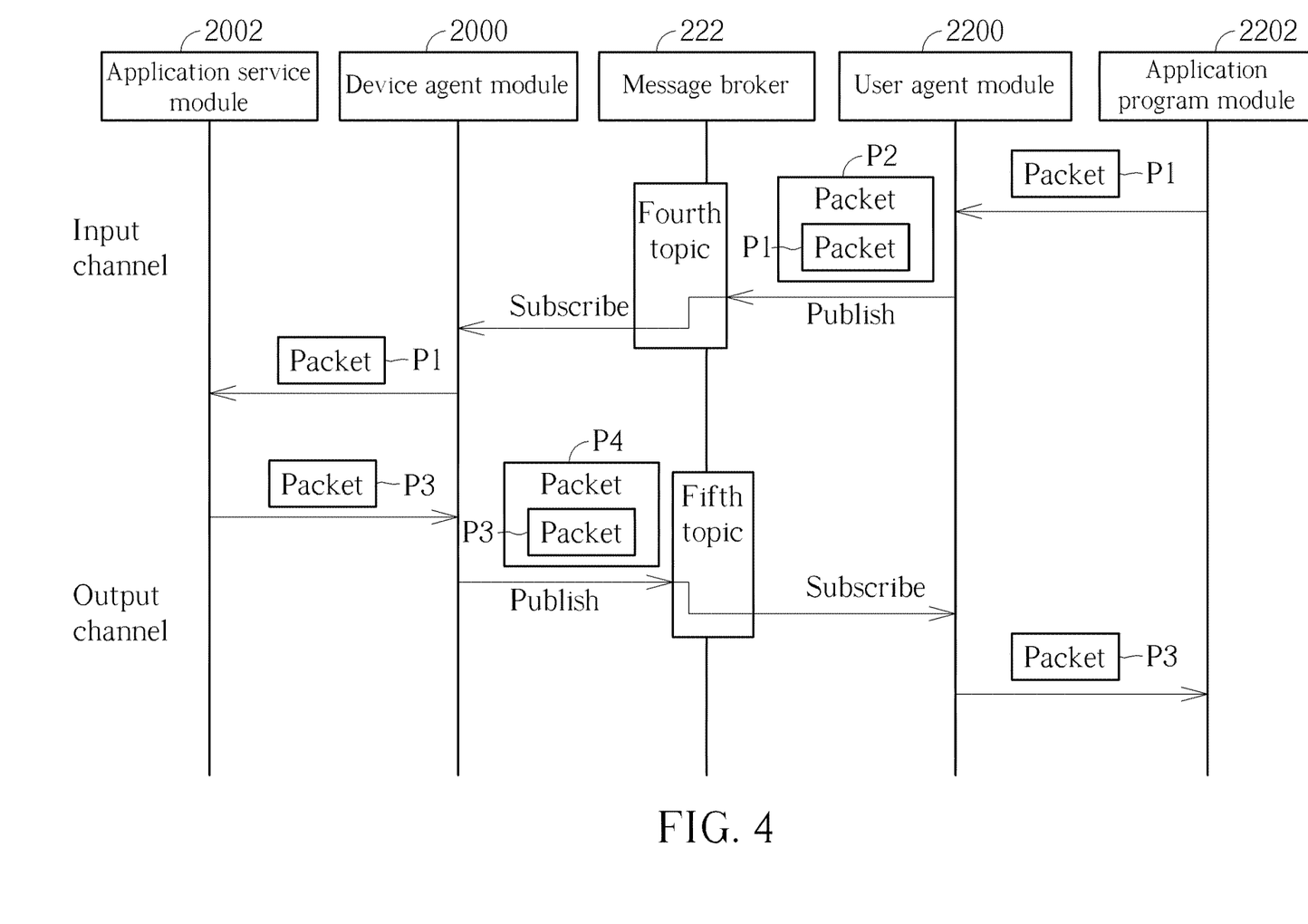
FIG. 4 is a schematic diagram of a session channel and message transmission according to an embodiment of the present invention.

Please continue to refer to FIG. 4, which is a schematic diagram of a session channel and message transmission of the network 2. Through the input channel, the application program module 2202 may send messages to the application service module 2002; through the output channel, the application service module 2002 may send messages to the application program module 2202. Accordingly, the network 2 may realize two-way communication between the user device 220 and the IOT device 200 through the message broker 222.

Specifically, regarding the input channel, the maintenance personnel may send a packet P1 for accessing the IoT device 200 through the application program module 2202. The packet P1 may be a packet using any communication protocol A supported by the network service of the IoT device 200, such as HTTP, SSH, FTP, and is not limited thereto. Next, the user agent module 2200 wraps the packet P1 into a packet P2 of a communication protocol B through the network I/O, and publishes the packet P2 to the fourth topic. The communication protocol B may be a communication protocol supported by the message broker 222, such as MQTT, AMQP, CoAP, etc., and is not limited thereto. Then, the message broker 222 dispatches the packet P2 to the device agent module 2000 that subscribed to the fourth topic, and the device agent module 2000 similarly takes out the packet P1 wrapped in the packet P2 through the network I/O and transmits the packet P1 to the application service module 2002. Accordingly, the maintenance personnel may use the communication protocol supported by the IoT device 200 to communicate with the IoT device 200 through the application program module 2202. It should be noted that parsing or analyzing the content of the packet P1 is not necessary in the embodiment of the present invention, and wrapping the packet P1 into the packet P2 with the communication protocol B is sufficient to perform transmission. Preferably, the method of wrapping the packet P1 into the packet P2 of the communication protocol B is to put the packet P1 in the payload of the packet P2, but not limited thereto; correspondingly, the method for the device agent module 2000 to take out the packet P1 wrapped in the packet P2 is to extract the packet P1 from the payload of the packet P2.

On the other hand, the application service module 2002 of the IoT device 200 sends a packet P3 in response to the user device 220 through the output channel, wherein the packet P3 may be a packet using the communication protocol A. The device agent module 2000 wraps the packet P3 into a packet P4 of the communication protocol B through the network I/O, and then publishes the packet P4 to the fifth topic. The message broker 222 dispatches the packet P4 to the user agent module 2200 that subscribed to the fifth topic, and then the user agent module 2200 similarly takes out the packet P3 wrapped in the packet P4 through the Network I/O and transmits the packet P3 to the application program module 2202. Accordingly, the IoT device 200 may use the communication protocol supported by the application service module 2002 to communicate with the user device 220. As mentioned above, parsing or analyzing the content of the packet P3 is not necessary in the embodiment of the present invention, and wrapping the packet P3 into the packet P4 with the communication protocol B is sufficient to perform transmission. Preferably, the method of wrapping the packet P3 into the packet P4 of the communication protocol B is to put the packet P3 in the payload of the packet P4, but not limited thereto; correspondingly, the method for the user agent module 2200 to take out the packet P3 wrapped in the packet P4 is to extract the packet P3 from the payload of the packet P4.

Figure 5:
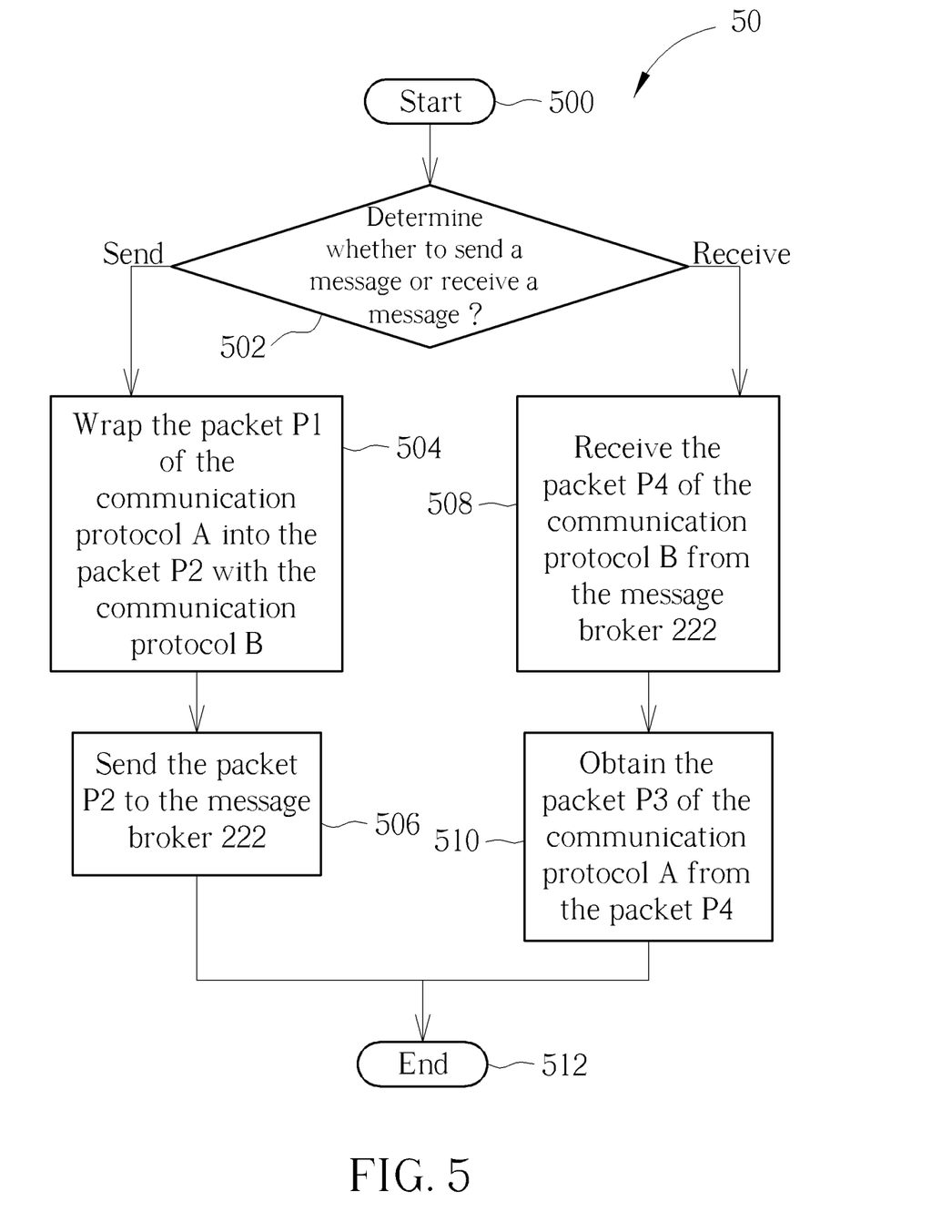
FIG. 5 is a schematic diagram of a communication method for a user terminal according to an embodiment of the present invention.

The communication method about the user device 220 (user terminal) mentioned above may be summarized into a process 50 as shown in FIG. 5, which is for communicating with the IoT device 200 (device terminal) through the message broker 222. The process 50 comprises the following steps:

Step 500: Start.
Step 502: Determine whether to send a message or receive a message. When determining to send the message, go to Step 504; when determining to receive the message, go to Step 508.
Step 504: Wrap the packet P1 of the communication protocol A into the packet P2 with the communication protocol B.
Step 506: Send the packet P2 to the message broker 222, and continue to Step 512.
Step 508: Receive the packet P4 of the communication protocol B from the message broker 222.
Step 510: Obtain the packet P3 of the communication protocol A from the packet P4.
Step 512: End.

Figure 6:
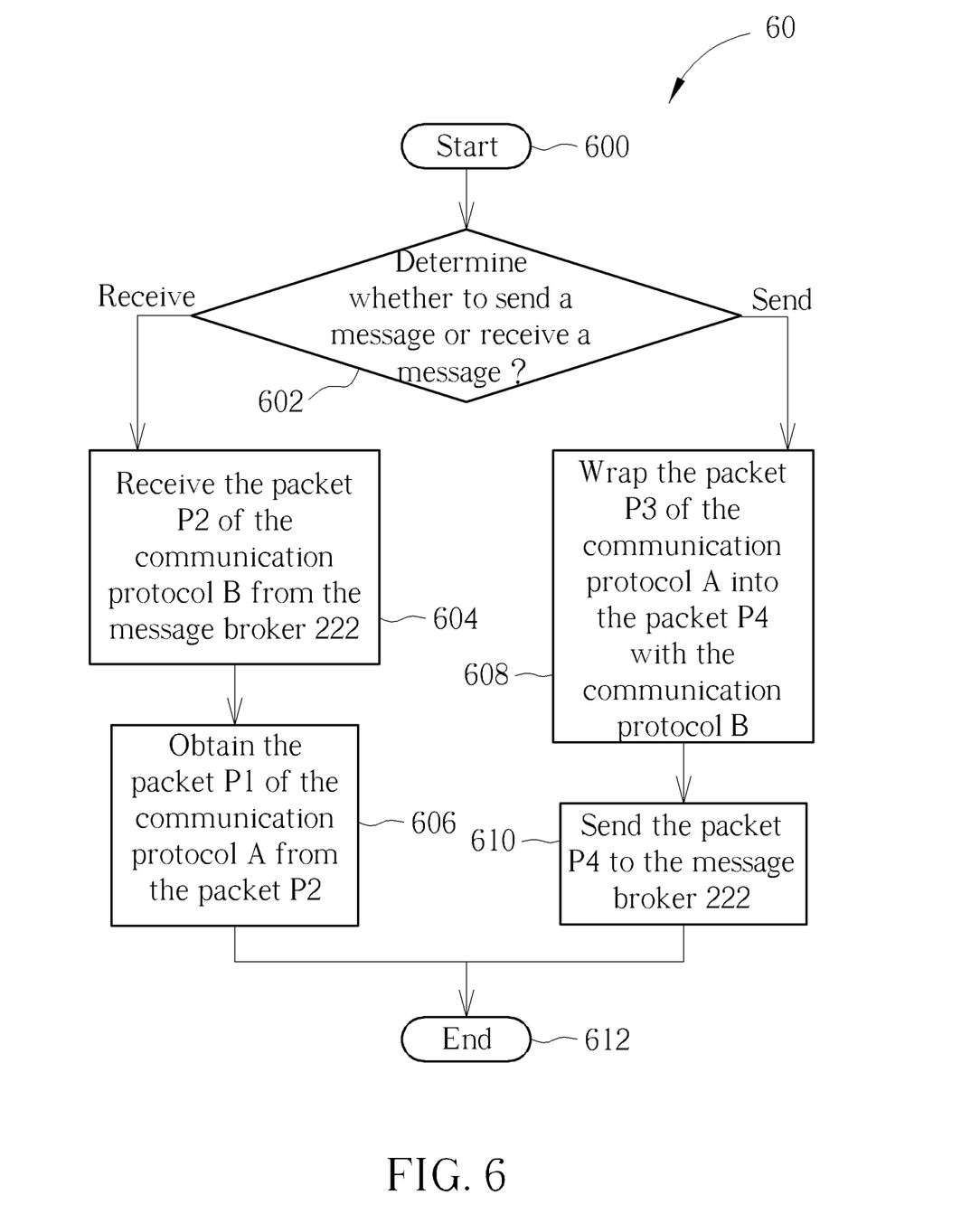
FIG. 6 is a schematic diagram of a communication method for an IoT device terminal according to an embodiment of the present invention.

The communication method about the IoT device 200 (device terminal) mentioned above may be summarized into a process 60 as shown in FIG. 6, which is for communicating with the user device 220 (user terminal) through the message broker 222. The process 60 comprises the following steps:

Step 600: Start.
Step 602: Determine whether to send a message or receive a message. When determining to receive the message, go to Step 604; when determining to send the message, go to Step 608.
Step 604: Receive the packet P2 of the communication protocol B from the message broker 222.
Step 606: Obtain the packet P1 of the communication protocol A from the packet P2, and continue to Step 612.
Step 608: Wrap the packet P3 of the communication protocol A into the packet P4 with the communication protocol B.
Step 610: Send the packet P4 to the message broker 222
Step 612: End.

After the message transmission between the user device 220 and the IoT device 200 is completed, the session should be closed and related resources should be released in Step 308. In detail, in the embodiment of the present invention, the session ID is generated when the session is created in Step 306, and the message handshake for closing the session may be performed through a sixth topic with a topic name comprising the device ID, the user ID, and the session ID. The topic name of the sixth topic may be and not limited to the form of "smtunnel/groupID/deviceID/clientID/sessionID/close", wherein the deviceID may be the device ID, the groupID may be the group ID of a group to which the device belongs, the clientID may be a user ID, and the sessionID may be the session ID of the session triggered in Step 306. When the access to the network service finishes, for example, when the TCP listening service of the user agent module 2200 reads End of File (EOF), the user agent module 2200 may publish a message for session close to the sixth topic, so as to notify the device agent module 2000 and release related resources. Similarly, the device agent module 2000 also comprises a TCP listening service. When the access to the network service finishes (e.g. the TCP listening service reads EOF), the device agent module 2000 may publish a message for session close to the sixth topic so as to notify the user agent module 2200 and release related resources. It should be noted that the establishment of the session is triggered when the TCP listening service of the entrance channel of the user agent module 2200 receives the application program module 2202 accessing the network service provided by the application service module 2002 of the IOT device 200, and the closing of the session is triggered when the user agent module 2200 or the device agent module 2000 detects the end of the access to the network service. During the process, maintenance personnel do not need to deal with cumbersome session and channel establishment issues, and the process is automatically triggered.

Note that, in the embodiment of the present invention, in Step 300 to Step 308 of the process 30, all of the message handshakes between the user agent module 2200 and the device agent module 2000 are handled through the communication protocol B supported by the message broker 222, such as device registration, obtaining the device list, obtaining the deviceID, session establishment and message transmission (i.e., wrapping the packet of communication protocol A). On the other hand, the handshakes between the application program module 2202 and the user agent module 2200 and between the application service module 2002 and the device agent module 2000 are completed through the communication protocol A. The maintenance personnel do not need to additionally process the message handshake between the user agent module 2200 and the device agent module 2000 (i.e., using communication protocol B), and only need to carry out the access to the network services provided by the application service module 2002 through the entrance channel provided by the user agent module 2200 (i.e., using communication protocol A).

Figure 7:
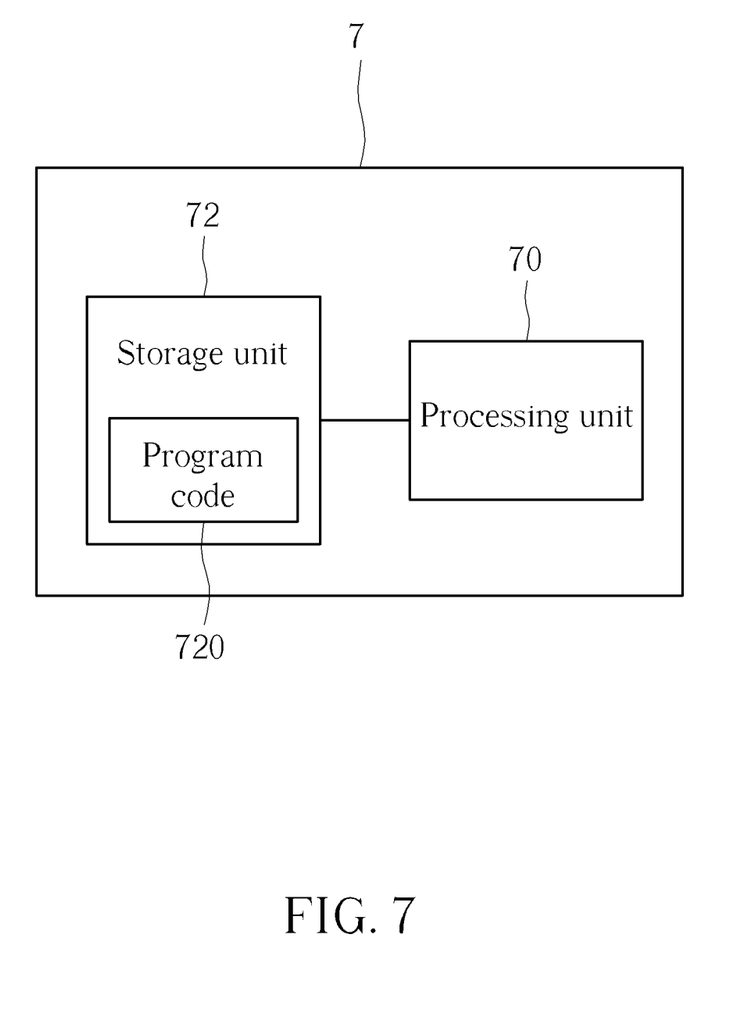
FIG. 7 is a schematic diagram of a network device according to an embodiment of the present invention.

Furthermore, please refer to FIG. 7, which is a schematic diagram of a network device 7 according to the embodiment of the present invention. The network device 7 may implement the IoT device 200, the user device 220 and the message broker 222 in the embodiment of the present invention. The network device 7 may be a low-cost device such as machine type communication (MTC), a device-to-device (D2D) communication device, a narrow-band IoT (NB-IOT) device, an electric device, a server, a mobile phone, various types of computers such (e.g., desktops, laptops, tablets), an portable computer system, or combination thereof, but is not limited herein. As shown in FIG. 7, the network device 7 may comprise a processing unit 70 and a storage unit 72. The processing unit 70 may be a general-purpose processor, a microprocessor an application-specific integrated circuit (ASIC), or combination thereof. The storage unit 72 is coupled to the processing unit 70 and may be any type of data storage devices for storing a program code 720, and the program code 720 is read and executed by the processing unit 70. For example, the storage unit 72 may be a read-only memory (ROM), a flash memory, a random-access memory (RAM), a hard disk, an optical data storage device, a non-volatile storage unit, etc., and is not limited thereto.

The network device 7 is used to represent the necessary components required to implement the embodiments of the present invention, and those skilled in the art may make various modifications and adjustments accordingly, and is not limited to this. For example, when the network device 7 is applied to implement the user device or the IoT device, the process 50 or the process 60 may be combined with the process 30 and complied into the program code 720, stored in the storage unit 72, and executed by the processing unit 70. Moreover, the storage unit 72 is also used for storing the data required for running the method of the embodiment of the present invention, and is not limited thereto. When the network device 7 is applied to implement the message broker, the message service applicable to the Internet of Things (MQTT, AMQP, CoAP, etc.) may be compiled into the program code 720 and stored in the storage unit 72, and the processing unit 70 executes the intermediary services for message forwarding, but not limited to.

In summary, the present invention provides a method for transmitting messages through a message broker, and establishes a reliable, safe and convenient channel for accessing network services of remote devices without additional components. For the maintenance personnel, it is feasible to directly access the IoT devices using the communication protocols supported by the IoT devices. For the IoT devices, low performance requirements may be maintained without additional components. From the perspective of management, the present invention uses the existing message broker in the general Internet of Things to simplify the maintenance and operation of connection management, and improve the problem of high management cost in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method for a user terminal to communicate with a device terminal through a message broker, comprising:
   wrapping a first packet of a first communication protocol into a second packet with a second communication protocol and sending the second packet to the message broker; or
   receiving a third packet of the second communication protocol from the message broker and obtaining a fourth packet of the first communication protocol wrapped in the third packet;
   wherein the first communication protocol is a communication protocol supported by the device terminal, and the second communication protocol is a communication protocol supported by the message broker;
   wherein the second communication protocol is a communication protocol for Internet of Things (IoT) messages with a publish-subscribe pattern;
   wherein the communication method further comprises the device terminal registering to the message broker through a first topic with a topic name comprising a device identification (ID);
   wherein the communication method further comprises:
   establishing an entrance channel for a user of the user terminal to communicate with the device terminal;
   creating a session when the user communicates with the device terminal through the entrance channel; and
   establishing a session channel according to the device ID of the device terminal, a user ID of the user terminal and a session ID of the session, wherein the session channel at least comprises a fourth topic and a fifth topic with topic names comprising the device ID, the user ID, and the session ID.

2. The communication method of claim 1, further comprising the device terminal publishing a connection status of the device terminal to the first topic.

3. The communication method of claim 2, further comprising the user terminal obtaining the first topic comprising the device ID of the device terminal through topic filtering, and the user terminal obtaining the connection status of the device terminal by subscribing to the first topic.

4. The communication method of claim 3, further comprising:
   publishing a login information for logging in to the device terminal through a second topic with a topic name comprising the user ID of the user terminal and the device ID of the device terminal; and
   publishing a logout information for logging out from the device terminal through a third topic with a topic name comprising the user ID of the user terminal and the device ID of the device terminal.

5. The communication method of claim 4, further comprising the device terminal obtaining the user ID, the login information and the logout information of the user terminal by subscribing to the second topic and the third topic.

6. The communication method of claim 1, wherein the step of sending the second packet to the message broker comprises publishing the second packet to the fourth topic so as to send the second packet to the message broker; wherein the step of receiving the third packet of the second communication protocol from the message broker comprises subscribing to the fifth topic so as to receive the third packet of the second communication protocol from the message broker.

7. The communication method of claim 1, further comprising the user terminal or the device terminal sending a close message to the other through a sixth topic with a topic name comprising the device ID, the user ID and the session ID to close the session and release resources.

8. A communication method for a device terminal to communicate with a user terminal through a message broker, comprising:
receiving a first packet of a first communication protocol from the message broker and obtaining a second packet of a second communication protocol wrapped in the first packet; or
wrapping a third packet of the second communication protocol into a fourth packet with the first communication protocol and sending the fourth packet to the message broker;
wherein the first communication protocol is a communication protocol supported by the message broker, and the second communication protocol is a communication protocol supported by the device terminal;
wherein the first communication protocol is a communication protocol for Internet of Things (IoT) messages with a publish-subscribe pattern;
wherein the communication method further comprises the device terminal registering to the message broker through a first topic with a topic name comprising a device identification (ID);
wherein the communication method further comprises:
establishing an entrance channel for a user of the user terminal to communicate with the device terminal;
creating a session when the user communicates with the device terminal through the entrance channel; and
establishing a session channel according to the device ID of the device terminal, a user ID of the user terminal and a session ID of the session, wherein the session channel at least comprises a fourth topic and a fifth topic with topic names comprising the device ID, the user ID, and the session ID.

9. The communication method of claim 8, further comprising the device terminal publishing a connection status of the device terminal to the first topic.

10. The communication method of claim 9, further comprising the user terminal obtaining the first topic comprising the device ID of the device terminal through topic filtering, and the user terminal obtaining the connection status of the device terminal by subscribing to the first topic.

11. The communication method of claim 10, further comprising:
publishing, by the user terminal, a login information for logging in to the device terminal through a second topic with a topic name comprising the user ID of the user terminal and the device ID of the device terminal; and
publishing, by the user terminal, a logout information for logging out from the device terminal through a third topic with a topic name comprising the user ID of the user terminal and the device ID of the device terminal.

12. The communication method of claim 11, further comprising the device terminal obtaining the user ID, the login information and the logout information of the user terminal by subscribing to the second topic and the third topic.

13. The communication method of claim 8, wherein the step of receiving the first packet of the first communication protocol from the message broker comprises subscribing to the fourth topic so as to receive the first packet of the first communication protocol from the message broker; wherein the step of sending the fourth packet to the message broker comprises publishing the fourth packet to the fifth topic so as to send the fourth packet to the message broker.

14. The communication method of claim 8, further comprising the user terminal or the device terminal sending a close message to the other through a sixth topic with a topic name comprising the device ID, the user ID and the session ID to close the session and release resources.

15. A communication system, comprising:
a user terminal;
a device terminal; and
a message broker, coupled to the user terminal and the device terminal, for exchanging packets between the user terminal and the device terminal, wherein the user terminal and the device terminal perform a communication method through the message broker, the communication method comprises:
the user terminal wrapping a first packet of a first communication protocol into a second packet with a second communication protocol and sending the second packet to the message broker, and the device terminal receiving the second packet of the second communication protocol from the message broker and obtaining the first packet of the first communication protocol wrapped in the second packet; or
the device terminal wrapping a third packet of the first communication protocol into a fourth packet with the second communication protocol and sending the fourth packet to the message broker, and the user terminal receiving the fourth packet of the second communication protocol from the message broker and obtaining the third packet of the first communication protocol wrapped in the fourth packet;
wherein the first communication protocol is a communication protocol supported by the device terminal, and the second communication protocol is a communication protocol supported by the message broker;
wherein the second communication protocol is a communication protocol for Internet of Things (IoT) messages with a publish-subscribe pattern;
wherein the communication method further comprises the device terminal registering to the message broker through a third topic with a topic name comprising a device identification (ID);
wherein the communication method further comprises:
establishing an entrance channel for a user of the user terminal to communicate with the device terminal;
creating a session when the user communicates with the device terminal through the entrance channel; and
establishing a session channel according to the device ID of the device terminal, a user ID of the user terminal and a session ID of the session, wherein the session channel at least comprises a first topic and a second topic with topic names comprising the device ID, the user ID, and the session ID.

16. The communication system of claim 15, wherein the step of the user terminal sending the second packet to the message broker comprises publishing the second packet to the first topic so as to send the second packet to the message broker; wherein the step of the device terminal receiving the second packet of the second communication protocol from the message broker comprises subscribing to the first topic so as to receive the second packet of the second communication protocol from the message broker.

17. The communication system of claim 15, wherein the step of the device terminal sending the fourth packet to the message broker comprises publishing the fourth packet to the second topic so as to send the fourth packet to the message broker; wherein the step of the user terminal receiving the fourth packet of the second communication protocol from the message broker comprises subscribing to the second topic so as to receive the fourth packet of the second communication protocol from the message broker.

\* \* \* \* \*